(12) United States Patent
Xiong et al.

(10) Patent No.: US 10,317,874 B2
(45) Date of Patent: Jun. 11, 2019

(54) CRITICAL POINT LOCKING METHODS OF SERVOS AND DEVICES THEREOF

(71) Applicant: UBTECH Robotics Corp., Shenzhen (CN)

(72) Inventors: Youjun Xiong, Shenzhen (CN); Lifu Zhang, Shenzhen (CN); Xi Bai, Shenzhen (CN); Wenhua Fan, Shenzhen (CN)

(73) Assignee: UBTECH Robotics Corp., Shenzhen (CN)

( * ) Notice: Subject to any disclaimer, the term of this patent is extended or adjusted under 35 U.S.C. 154(b) by 119 days.

(21) Appl. No.: 15/640,581

(22) Filed: Jul. 3, 2017

(65) Prior Publication Data

US 2018/0188707 A1    Jul. 5, 2018

(30) Foreign Application Priority Data

Dec. 31, 2016 (CN) .......................... 2016 1 1263269

(51) Int. Cl.
*G05B 19/23* (2006.01)
*G05B 19/402* (2006.01)

(52) U.S. Cl.
CPC ........... *G05B 19/402* (2013.01); *G05B 19/23* (2013.01); *G05B 2219/34013* (2013.01); *G05B 2219/37589* (2013.01)

(58) Field of Classification Search
CPC .................. G05B 19/402; G05B 19/23; G05B 2219/37589; G05B 2219/34013
USPC .......................................................... 700/79
See application file for complete search history.

(56) References Cited

U.S. PATENT DOCUMENTS

| 5,258,966 A * | 11/1993 | Yanagi ............... | G11B 7/08517 369/30.17 |
| 5,886,491 A * | 3/1999 | Yoshida ............... | G05B 13/024 318/568.17 |
| 8,576,506 B1 * | 11/2013 | Wang .................. | G11B 5/59688 360/39 |
| 2002/0181840 A1* | 12/2002 | Laberge ............... | G02B 6/3572 385/17 |
| 2003/0229408 A1* | 12/2003 | Yasui ................... | G05B 13/042 700/30 |
| 2003/0230821 A1* | 12/2003 | Okado .................... | B29C 43/58 264/40.5 |
| 2013/0100787 A1* | 4/2013 | Fujiune ............... | G11B 7/08511 369/44.14 |

* cited by examiner

*Primary Examiner* — Ziaul Karim

(57) ABSTRACT

The present disclosure relates to a critical point locking method of servos, including: computing a current target deviation according to a target position and an actual position, computing a variation value according to the current target deviation and a previous target deviation, determining whether the variation value being greater than a constraint value, modifying the current target deviation according to the current target deviation and a predetermined value upon determining the predetermined condition being satisfied, configuring the modified current target deviation as a current controlling deviation, and driving the servo to move toward the target position according the current controlling deviation. As such, the servo may lock the position for 360 degrees, the locking stroke of the servo may be improved, and the application of the servo may be enlarged.

7 Claims, 4 Drawing Sheets

CRITICAL POINT LOCKING METHODS OF SERVOS AND DEVICES THEREOF

CROSS REFERENCE TO RELATED APPLICATIONS

This application claims priority to Chinese Patent Application No. 201611263269.4, filed Dec. 31, 2016, which is hereby incorporated by reference herein in its entirety.

BACKGROUND

1. Technical Field

The present disclosure relates to servo field, and particularly to a critical point locking method of servos and a device thereof.

2. Description of Related Art

The conventional servos are not capable of locking the position for 360 degrees, and thus the dead zone may exist, in particular, in the critical angle area of the position sensor. If the target position is within the dead zone, the servos are not able to lock the target position after a forward/reverse rotation of an arbitrary angle. As such, the application of the servos may be limited.

FIG. 1 is a schematic view showing the coordinate of 12-bit digital magnetic encoders. The straight line indicates an angle jump point. The position value at the left side of the straight line is 4095, and the position value at the straight line is 0. The conventional controlling method may drive the servo to move along a wrong direction or may directly lose the control of the servo when the servo locks an angle within an area nearby the straight line. For example, the servo locks the angle at the zero position, assuming the servo is perfectly located at the zero position at the beginning, when the actual angle of the servo is shifted from 0 to 4090 by an external force, the deviation value computed by the conventional deviation computation method is −4090 (target position minus current actual position). However, a radical response may be generated under the proportional-integral-derivative (PID) control method, the operating direction of the servo may be wrong. That is, the servo may need to turn a full circle so as to return to the original target position.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 2:
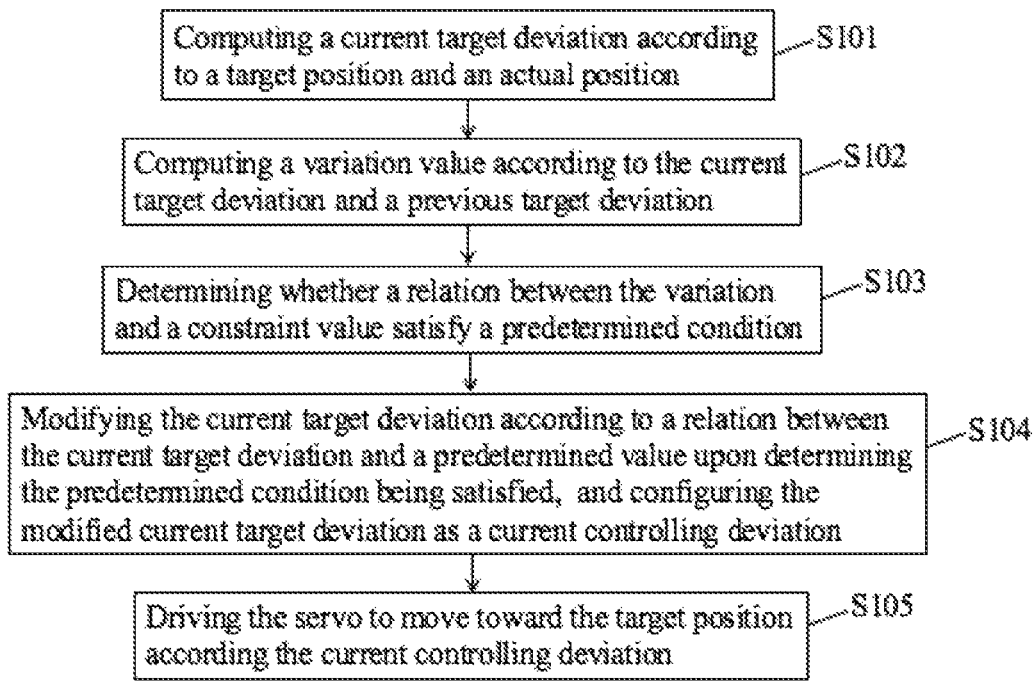
FIG. 2 is a flowchart of a critical point locking method of servos in accordance with a first embodiment of the present disclosure.

In one embodiment, as shown in FIG. 2, the present disclosure relates to a critical point locking method of servos, including the following steps.

In step S101: computing a current target deviation according to a target position and an actual position.

Specifically, the step of computing the current target deviation according to the target position and the actual position further includes calculating a difference between the target position and the actual position.

In step S102: computing a variation value according to the current target deviation and a previous target deviation.

Specifically, the step of computing the variation value according to the current target deviation and the previous target deviation further includes calculating an absolute value of a difference between the current target deviation and the previous target deviation.

In step S103: determining whether a relation between the variation value and a constraint value satisfies a predetermined condition.

Specifically, the step of determining whether the relation between the variation value and the constraint value satisfy the predetermined condition further includes determining whether the variation value is greater than the constraint value. The constraint value may be configured according to a maximum position coding value. For example, the constraint value may equal to one-half of the maximum position coding value.

The main reason that rotated-coding servos are not able to lock the position well within an area nearby a jump point is that the angle values within the area may change suddenly, which may result in a great jump of the controlling deviations. According to actual movements of the servo, operation velocity of the servo is not allowed to change suddenly. Servo displacement, which equals to an integral of the velocity with respect to time, is also not allowed to change suddenly. The deviation between the actual position and the target position of the servo is configured to be the uncompleted movement, and the deviation is also not allowed to change suddenly. Therefore, the predetermined condition is also configured during the controlling deviation of the controlling process of the servo, so as to determine whether the target deviation has been changed suddenly.

If a variation value is greater than the constraint value, the target deviation has been changed suddenly. The current target deviation is modified to avoid the sudden change of the controlling deviation resulting from the sudden change of the angle values. A continuous constraint is conducted with respect to the deviation, in particular, the proportional-integral-derivative (PID) controlled servos. The magnetic encoding servo may lock the position for 360 degrees without adding any external circuit and without replacing any position sensor. As such, the locking stroke of the servo may be improved and the application of the servo may be enlarged.

In step S104: modifying the current target deviation according to a relation between the current target deviation and a predetermined value upon determining the predetermined condition being satisfied, and configuring the modified current target deviation as a current controlling deviation.

The current target deviation is configured to be wrong when there is a sudden change exists when calculating target deviation result. It is necessary to recalculate the current target deviation using a new calculation formula so as to guarantee the continuity of the controlling deviation.

In one example, the step of modifying the current target deviation according to the relation between the current target deviation and the predetermined and configuring the modified current target deviation as a current controlling deviation further includes the following steps.

The current controlling deviation is configured by summing up the current target deviation and a maximum position coding value upon determining the current target deviation is less than the predetermined value; the current controlling deviation is configure to be as the current target deviation minus the maximum position coding value upon determining the current target deviation is greater than the predetermined value; and the current controlling deviation is configure to be the previous target deviation upon determining the current target deviation equals to the predetermined value.

Figure 1:
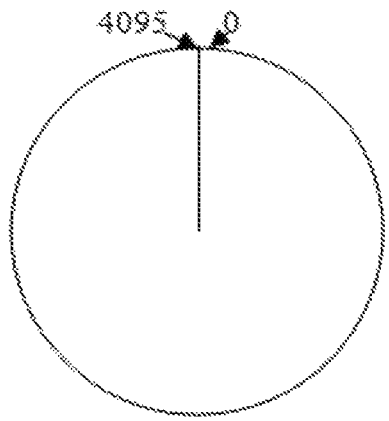
FIG. 1 is a schematic view showing the coordinate of 12-bit digital magnetic encoders.

As shown in FIG. 1, the straight line in the figure is the angle jump point. The conventional controlling method may drive the servo to move along a wrong direction or may directly lose the control of the servo when the servo locks an angle within an area nearby the straight line. The position value at the left side of the straight line is 4095, and the position value at the straight line is 0. In one example, the predetermined value is 0. Upon determining the sudden change with respect to the current target deviation, the current controlling deviation is obtained by summing up the current target deviation and the maximum position coding value. The modification of the current target deviation may prevent the servos from being moved along the wrong direction or prevent the servos from directly losing the control when the locking position of the servos is within the dead zone.

In step S105: driving the servo to move toward the target position according the current controlling deviation.

The servo is controlled by applying the modified current controlling deviation to operate the PID control. As such, the magnetic encoding servo may be able to lock the position within the area nearby the jump point.

In view of the above, the predetermined condition is configured during the controlling process of the servo, so as to determine whether the target deviation has been changed suddenly. If the target deviation has changed suddenly, the current target deviation may be modified to avoid the sudden change of the controlling deviation resulting from the sudden change of the angle values. The continuous constraint is conducted with respect to the deviation, in particular, the PID-controlled servos. The magnetic encoding servo may lock the position for 360 degrees without adding any external circuit and without replacing any position sensor. As such, the locking stroke of the servo may be improved and the application of the servo may be enlarged.

Figure 3:
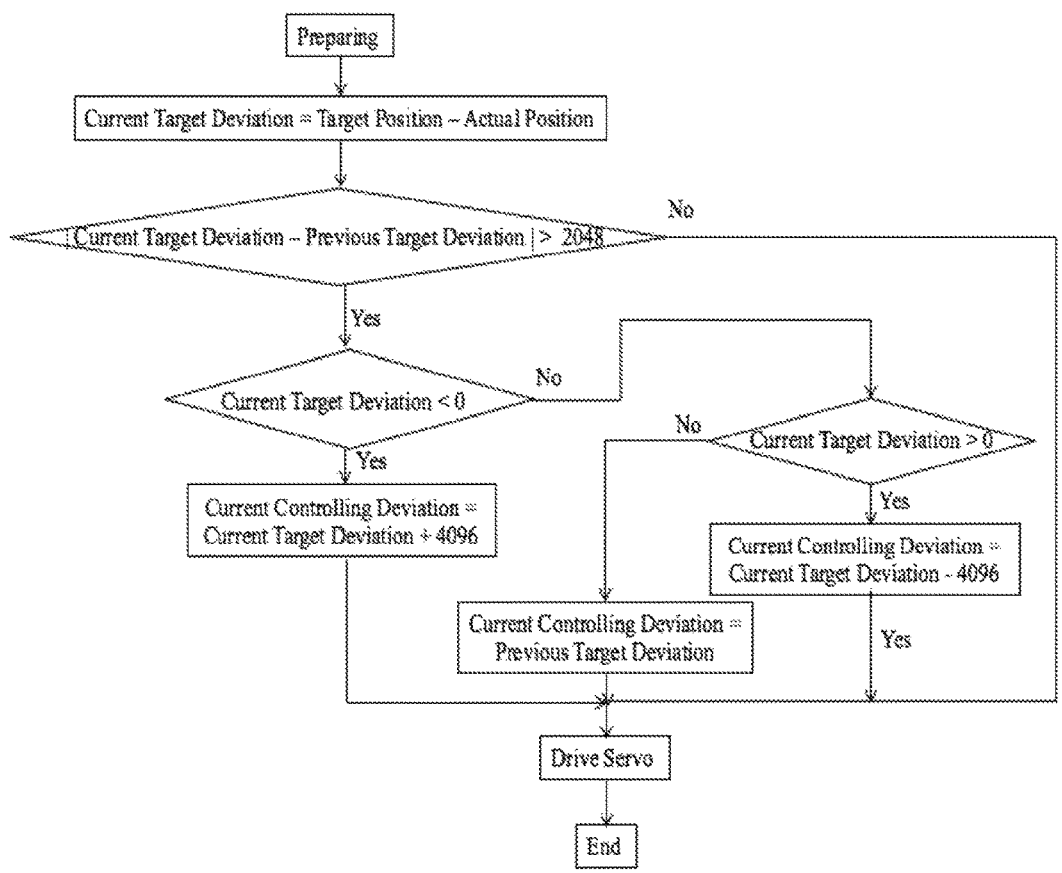
FIG. 3 is a flowchart of a critical point locking method of servos in accordance with a second embodiment of the present disclosure.
Figure 4:
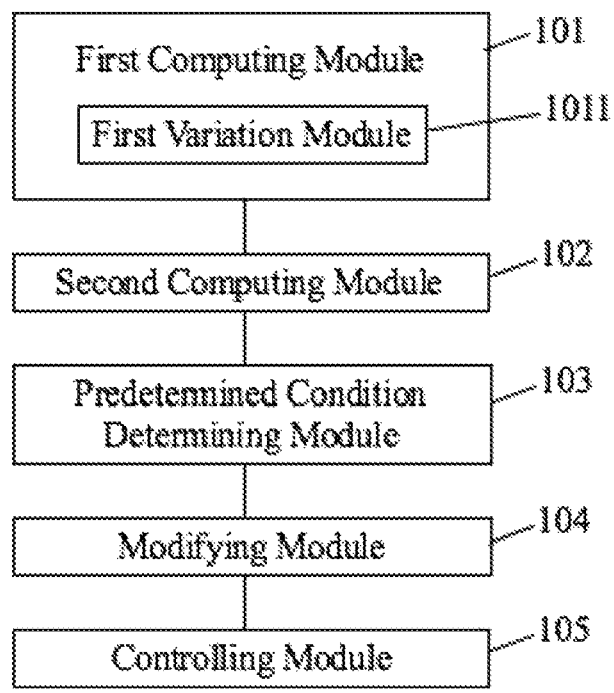
FIG. 4 is a flowchart of a critical point locking method of servos in accordance with a third embodiment of the present disclosure.

In another embodiment, as shown in FIG. 3, a rotary encoder is adopted to control the servo. In one example, the rotary encoder may be absolute encoders or rotary incremental encoders. The rotary encoder is in 12 bits, and the maximum position coding value is 4096. In one example, the constraint value may be 2048 and the predetermined value may be 0. Specifically, the current target deviation is configured to be the current controlling deviation upon determining the relation between the variation value and the constraint value dissatisfy the predetermined condition.

For example, the servo locks the zero position, assuming the servo is perfectly located at the zero position at the beginning, when the actual angle of the servo is shifted from 0 to 4090 by an external force, the deviation value computed by the conventional deviation computation method is −4090 (target position minus current actual position). However, a radical response will be generated under the PID-controlled method, the operating direction of the servo may be wrong, and the servo needs to turn a full circle to return to the original target position.

With respect to the critical point locking method of servos of the present disclosure, when the current target deviation is −4090 (target position minus current actual position) and the previous target deviation is 0. The variation value is 4090 which is greater than the constraint value 2048. Thus, the sudden change exists in the target deviation, and the current target deviation may need to be modified. Due to the current target deviation is less than 0, the current controlling deviation is configured to be 6 (the summation of the current target deviation −4090 and the maximum position coding value 4096). Therefore, the servo may return to the original target position by revolving a small angle.

In another example, the current target deviation is configured to be as the difference between the actual position and the target position. The step of configuring the current controlling deviation as the current target deviation according to the relation between the current target deviation and the predetermined value further includes the following steps.

The current controlling deviation is configured by summing up the current target deviation and the maximum position coding value upon determining the current target deviation is greater than the predetermined value; the current controlling deviation is configure to be as the current target deviation minus the maximum position coding value upon determining the current target deviation is less than the predetermined value; and the current controlling deviation is configure to be the previous target deviation upon determining the current target deviation equals to the predetermined value.

In another aspect, the present disclosure further relates to a critical point locking device of servos, including the following elements.

A first computing module 101 is configured to compute the current target deviation according to the target position and the actual position.

A second computing module 102 is configured to compute the variation value according to the current target deviation and the previous target deviation. Specifically, the second computing module 102 is configured to calculate the absolute value of the difference between the current target deviation and the previous target deviation.

A predetermined condition determining module 103 is configured to determine whether the relation between the variation value and the constraint value satisfy the predetermined condition. Specifically, the predetermined condition determining module 103 is configured to determine whether the absolute value of the difference between the current target deviation and the previous target deviation is greater than the constraint value.

A modification module 104 is configured to modify the current target deviation according to the relation between the current target deviation and the predetermined value, and the modification module 104 is configured to configure the modified current target deviation as the current controlling deviation upon determining the predetermined condition being satisfied.

A controlling module 105 is configured to drive the servo to move to the target position according the current controlling deviation.

In one example, the critical point locking device of servos further includes a maintaining module (not shown) configured to configure the current controlling deviation to be the current target deviation upon determining the predetermined condition is dissatisfied.

Specifically, the first computing module further includes a first variation module 1011 configured to calculate the difference between the target position and the actual position.

Figure 5:
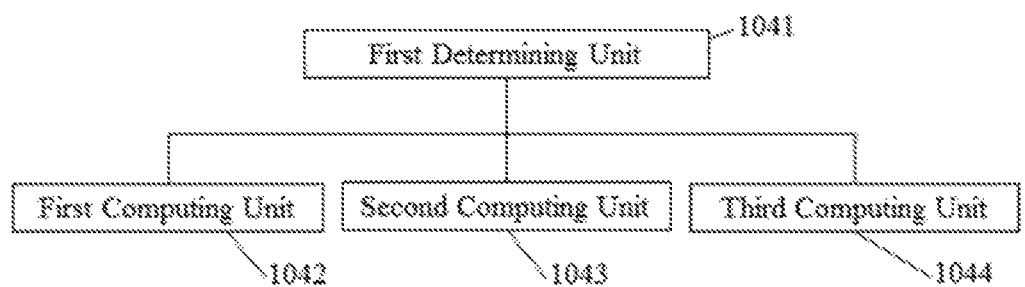
FIG. 5 is a schematic view of a modification module shown in FIG. 4.

As shown in FIG. 5, the modification module further includes: a first determining unit 1041 is configured to determine the relation between the current target deviation and the predetermined value, a first computing unit 1042 is configured to sum up the current target deviation and the maximum position coding value upon determining the current target deviation is less than the predetermined value, a second computing unit 1043 is configured to subtract the current target deviation with the maximum position coding value upon determining the current target deviation is greater than the predetermined value, and a third computing unit 1044 is configured to configured the current controlling deviation to be the previous target deviation upon determining the current target deviation equals to the predetermined value.

The critical point locking device of servos and the critical point locking method of servos are two aspects based on a same conception. The detail of the method has been fully described, so that the person skilled in the art may understand the structure of device and process of the method in the present disclosure. In order to simplify the description, the detail may not be repeated again.

For the convenience of description, the above device is described in terms of functions in various modules respectively. Of course, the functionality of each module may be implemented in the same or more software or hardware.

In view of the embodiments described above, the person skilled in the art can conceive that the present application may be implemented by software together with hardware platform. Based on such understanding, the technical features of the present disclosure and the contribution to the prior art may be embodied in the form of a software product. The software product may be stored in a storage medium, such as ROM/RAM, disk, CD-ROM, including a plurality of instructions that can be executed by a computer device, which may be a personal computer, a server, or network equipment, so as to execute the method or the various embodiments of the present disclosure.

The described embodiment is illustrative, and the modules or units described as the separation means may or may not be physically separated, and the components indicated as modules or units may or may not be physical modules. Thus, it may be configured either in one piece or in multiple network modules. The part of or all of the elements may be selected according to the actual needs to achieve the object of the present embodiment. The person skilled in the art may understand and practice without paying creative work.

The present disclosure may be used in a variety of general purpose or special computing system environments or configurations. Such as personal computers, server computers, handheld devices, portable devices, flatbed devices, multi-processor systems, microprocessor-based systems, set-top boxes, programmable consumer electronics devices, web personal computers (PCs), small computers, large computers, and any system or device in distributed computing environment.

Figure 6:
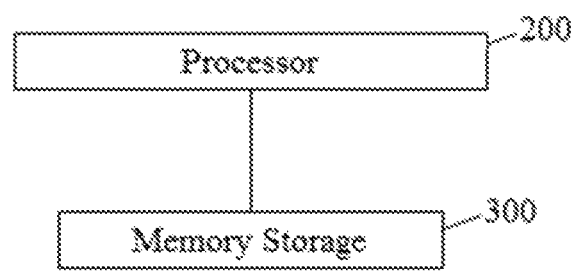
FIG. 6 is a flowchart of a critical point locking method of servos in accordance with a fourth embodiment of the present disclosure.

In another embodiment, as shown in FIG. 6, the present disclosure further relates to a critical point locking device of servos, wherein the critical point locking device includes: a processor 200, and a least one memory is storage 300 configured to store instructions executable by the processor 200.

Wherein the processor 200 is configured to compute the current target deviation according to the target position and the actual position, to compute the variation value according to the current target deviation and the previous target deviation, to determine whether the variation value is greater than the constraint value, to modify the current target deviation according to the relation between the current target deviation and the predetermined value, to configure the modified current target deviation as the current controlling deviation upon determining the predetermined condition being satisfied, to drive the servo to move to the target position according the current controlling deviation.

Specifically, the processor 200 is configured to configured the current target deviation is configured to be the current controlling deviation upon determining the relation between the variation value and the constraint value dissatisfy the predetermined condition.

The critical point locking device of servos and the critical point locking method of servos are two aspects based on a same conception. The detail of the method has been fully described, so that the person skilled in the art may understand the structure of device and process of the method in the present disclosure. In order to simplify the description, the detail may not be repeated again.

In view of the above, the predetermined condition is configured during the controlling process of the servo, so as to determine whether the target deviation has been changed suddenly. If the target deviation has changed suddenly, the current target deviation may be modified to avoid the sudden change of the controlling deviation resulting from the sudden change of the angle values. The continuous constraint is conducted with respect to the deviation, in particular, the PID-controlled servos. The magnetic encoding servo may lock the position for 360 degrees without adding any external circuit and without replacing any position sensor. As such, the locking stroke of the servo may be improved and the application of the servo may be enlarged.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A critical point locking method for a servo comprising a processor and a magnetic encoder electronically connected to the processor, the method comprising:
    obtaining, by the magnetic encoder, an actual position of the servo, and feeding back the actual position to the processor;
    computing, by the processor, a difference between a target position and the actual position to obtain a current target deviation;
    computing, by the processor, a variation value according to the current target deviation and a previous target deviation;
    determining, by the processor, whether the variation value is greater than a constraint value;
    modifying, by the processor, the current target deviation according to the current target deviation and a predetermined value in response to the variation value being greater than the constraint value;

setting, by the processor, the modified current target deviation as a current controlling deviation; and moving, by the processor, the servo toward the target position, and controlling the servo to lock an angle at the target position according to the current controlling deviation;

wherein the step of modifying, by the processor, the current target deviation according to the current target deviation and the predetermined value further comprises:

setting the current controlling deviation by summing up the current target deviation and a maximum position coding value, in response to the current target deviation being less than the predetermined value;

setting the current controlling deviation as the current target deviation minus the maximum position coding value, in response to the current target deviation being greater than the predetermined value; and setting the current controlling deviation to be the previous target deviation, in response to the current target deviation being equal to the predetermined value.

2. The critical point locking method according to claim 1, wherein the step of computing, by the processor, the variation value according to the current target deviation and the previous target deviation further comprises:

calculating, by the processor, an absolute value of a difference between the current target deviation and the previous target deviation.

3. The critical point locking method according to claim 2, wherein the constraint value is configured according to the maximum position coding value.

4. The critical point locking method according to claim 3, wherein the constraint value equals to one-half of the maximum position coding value.

5. The critical point locking method according to claim 2, wherein the predetermined value is zero.

6. A critical point locking device for a servo, the device comprising:
one or more processor;
a magnetic encoder electronically connected to the one or more processor;
memory storage; and
one or more programs, wherein the one or more programs are stored in the memory storage and configured to be executed by the one or more processor, the one or more programs control the critical point locking device to:

obtain an actual position of the servo and feed back the actual position to the one or more processor by the magnetic encoder;

compute a difference between a target position and the actual position to obtain a current target deviation;

compute a variation value according to the current target deviation and a previous target deviation;

determine whether the variation value is greater than a constraint value;

modify the current target deviation according to the current target deviation and a predetermined value in response to the variation value being greater than the constraint value;

set the modified current target deviation as a current controlling deviation; and move the servo toward the target position, and control the servo to lock an angle at the target position according to the current controlling deviation;

wherein the one or more programs further control the device to:

set the current controlling deviation by summing up the current target deviation and a maximum position coding value, in response to the current target deviation being less than the predetermined value;

set the current controlling deviation as the current target deviation minus the maximum position coding value, in response to the current target deviation being greater than the predetermined value; and set the current controlling deviation to be the previous target deviation, in response to the current target deviation being equal to the predetermined value.

7. The critical point locking device according to claim 6, wherein the one or more programs further control the device to:

calculate an absolute value of a difference between the current target deviation and the previous target deviation; and determine whether the absolute value of the difference between the current target deviation and the previous target deviation is greater than the constraint value.

* * * * *